United States Patent
Lemaster et al.

(10) Patent No.: US 10,668,639 B2
(45) Date of Patent: Jun. 2, 2020

(54) PILLOW TEMPLATE SYSTEM AND METHOD OF USE

(71) Applicant: Some Big Idea, LLC, Olathe, KS (US)

(72) Inventors: Trina J. Lemaster, Olathe, KS (US); William R. Warrington, Olathe, KS (US)

(73) Assignee: Some Big Idea, LLC, Olathe, KS (US)

(*) Notice: Subject to any disclaimer, the term of this patent is extended or adjusted under 35 U.S.C. 154(b) by 204 days.

(21) Appl. No.: 15/982,562

(22) Filed: May 17, 2018

(65) Prior Publication Data

US 2018/0333882 A1    Nov. 22, 2018

Related U.S. Application Data

(60) Provisional application No. 62/509,463, filed on May 22, 2017.

(51) Int. Cl.
| | |
|---|---|
| *B26B 29/06* | (2006.01) |
| *G01B 3/04* | (2006.01) |
| *B25H 7/02* | (2006.01) |
| *G01B 3/02* | (2020.01) |
| *D05B 35/02* | (2006.01) |
| *B68G 7/00* | (2006.01) |
| *A47G 9/10* | (2006.01) |

(52) U.S. Cl.
CPC ............ *B26B 29/06* (2013.01); *B25H 7/02* (2013.01); *D05B 35/02* (2013.01); *G01B 3/02* (2013.01); *G01B 3/04* (2013.01); *A47G 9/10* (2013.01); *B68G 7/00* (2013.01); *D05D 2305/00* (2013.01)

(58) Field of Classification Search
CPC ...................................................... B26B 29/06
USPC .................................................... 33/562, 563
See application file for complete search history.

(56) References Cited

U.S. PATENT DOCUMENTS

| | | |
|---|---|---|
| 4,779,346 A | 10/1988 | Schafer |
| 5,363,561 A | 11/1994 | Essary |
| 5,791,062 A | 8/1998 | Walker |
| 6,925,724 B2 | 8/2005 | Tandy |
| 7,464,480 B2 | 12/2008 | Vetromila |
| 7,469,485 B1* | 12/2008 | Perdue .................... B43L 7/10 33/454 |
| 7,854,073 B1 | 12/2010 | Webb |
| 8,261,680 B2 | 9/2012 | Oe |
| 8,397,396 B2 | 3/2013 | Nethery |
| 9,138,904 B2 | 9/2015 | Thomas et al. |
| 9,608,939 B2 | 3/2017 | Shukla et al. |
| 9,624,612 B2 | 4/2017 | Works |
| 2003/0110653 A1* | 6/2003 | Schafer ................. B26B 29/06 33/562 |

(Continued)

*Primary Examiner* — George B Bennett
(74) *Attorney, Agent, or Firm* — Law Office of Mark Brown, LLC; Christopher M. DeBacker (57) ABSTRACT

A pillow template system having at least one pillow template which is preferably made of a transparent or semi-transparent material which can be overlaid onto a piece of fabric and can quickly and easily be aligned on the fabric such that any patterns on the fabric are aligned in a desirable way. The template is a frame having an inner edge and an outer edge, with the width of the frame between the inner and outer edges providing a preferable seam allowance. In a preferred embodiment the frame can be nested into a stack with one or more additional frames. The size and shape of the pillow can vary based upon a selected one of the nested frames.

11 Claims, 10 Drawing Sheets

(56) References Cited

U.S. PATENT DOCUMENTS

| | | | |
|---|---|---|---|
| 2004/0143983 A1* | 7/2004 | Amaru | B43L 13/007 |
| | | | 33/492 |
| 2009/0205217 A1* | 8/2009 | Wharton | B26B 29/06 |
| | | | 33/565 |
| 2012/0005911 A1* | 1/2012 | MacFarlane | A47G 9/0253 |
| | | | 33/512 |
| 2012/0234150 A1* | 9/2012 | Holtgreive | B26B 29/06 |
| | | | 83/613 |
| 2013/0014681 A1 | 1/2013 | Kennedy et al. | |
| 2016/0279819 A1* | 9/2016 | McCormick | B26B 25/005 |

\* cited by examiner

PILLOW TEMPLATE SYSTEM AND METHOD OF USE

CROSS-REFERENCE TO RELATED APPLICATION

This application claims priority in U.S. Provisional Patent Application No. 62/509,463 Filed May 22, 2017, which is incorporated herein by reference.

BACKGROUND OF THE INVENTION

1. Field of the Invention

The present invention relates generally to a pillow template system and method for use thereof, and more specifically to a pre-configured pillow template system with nesting templates for different sized pillows which include seam allowance for easy pillow manufacture.

2. Description of the Related Art

Existing systems for custom-making pillows requires tedious measuring and marking using rulers, tape, and other items. Aligning these items up along fabric patterns can be difficult and can result in uneven pattern alignment along a face of a pillow. While existing templates have been developed for quilting, templates for custom-made pillows have not been adequately developed, and existing systems for quickly marking and creating custom pillows are typically large and expensive.

Heretofore there has not been available a system or method for a pillow template system with the advantages and features of the present invention.

BRIEF SUMMARY OF THE INVENTION

The present invention generally provides at least one pillow template which is preferably made of a transparent or semi-transparent material which can be overlaid onto a piece of fabric and can quickly and easily be aligned on the fabric such that any patterns on the fabric are aligned in a desirable way. The template is a frame having an inner edge and an outer edge, with the width of the frame between the inner and outer edges providing a preferable seam allowance.

In a preferred embodiment, more than one template can be nested together in a set for the manufacture of differently sized pillows. The shape of the templates can be square, rectangular, or of any other desirable shape.

BRIEF DESCRIPTION OF THE DRAWINGS

The drawings constitute a part of this specification and include exemplary embodiments of the present invention illustrating various objects and features thereof.

DETAILED DESCRIPTION OF THE PREFERRED EMBODIMENTS

I. Introduction and Environment

As required, detailed aspects of the present invention are disclosed herein, however, it is to be understood that the disclosed aspects are merely exemplary of the invention, which may be embodied in various forms. Therefore, specific structural and functional details disclosed herein are not to be interpreted as limiting, but merely as a basis for the claims and as a representative basis for teaching one skilled in the art how to variously employ the present invention in virtually any appropriately detailed structure.

Certain terminology will be used in the following description for convenience in reference only and will not be limiting. For example, up, down, front, back, right and left refer to the invention as orientated in the view being referred to. The words, "inwardly" and "outwardly" refer to directions toward and away from, respectively, the geometric center of the aspect being described and designated parts thereof. Forwardly and rearwardly are generally in reference to the direction of travel, if appropriate. Said terminology will include the words specifically mentioned, derivatives thereof and words of similar meaning.

II. Preferred Embodiment Pillow Template System 2

Figure 1:
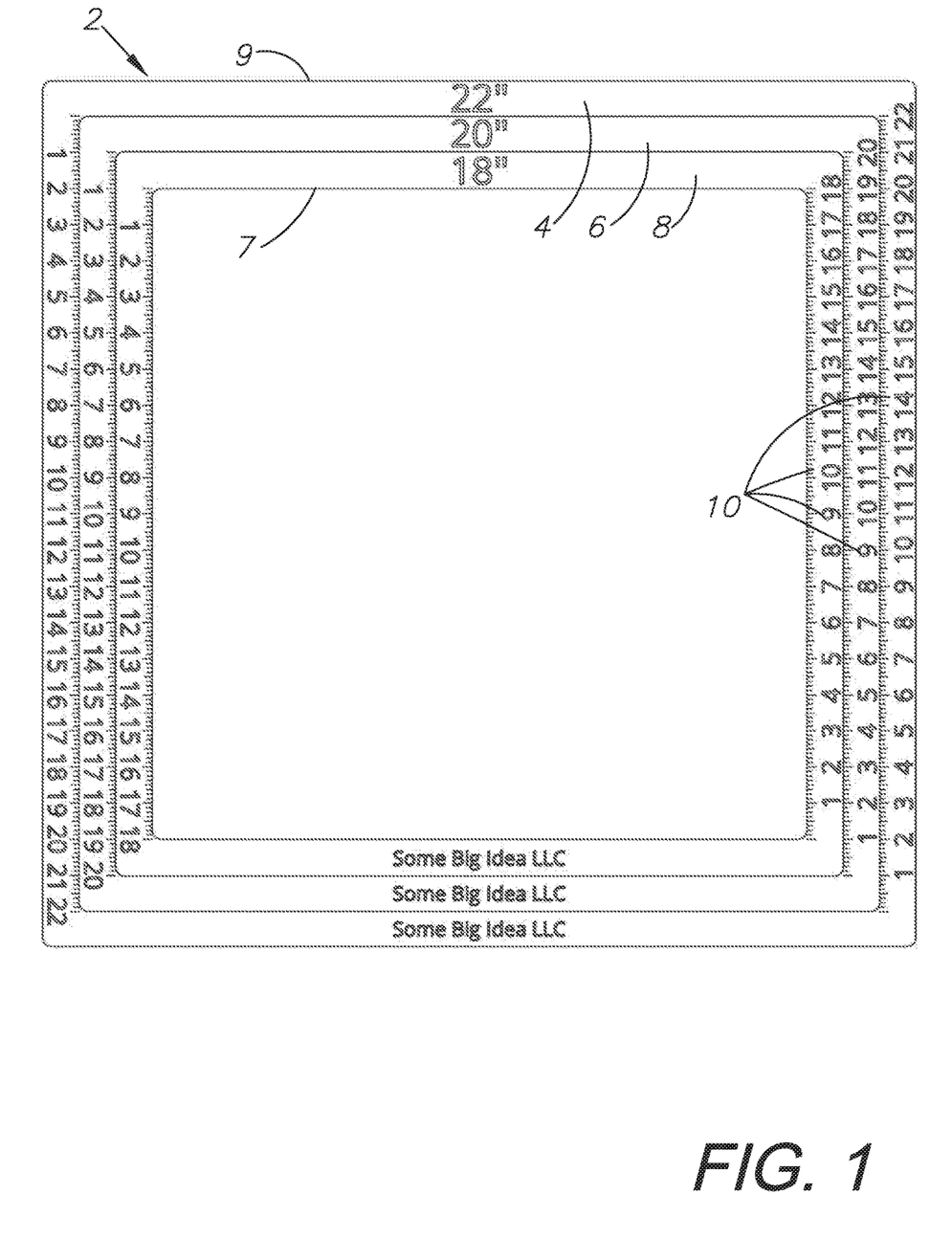
FIG. 1 is a top plan view of an embodiment of the present invention shown in a nested orientation.
Figure 6:
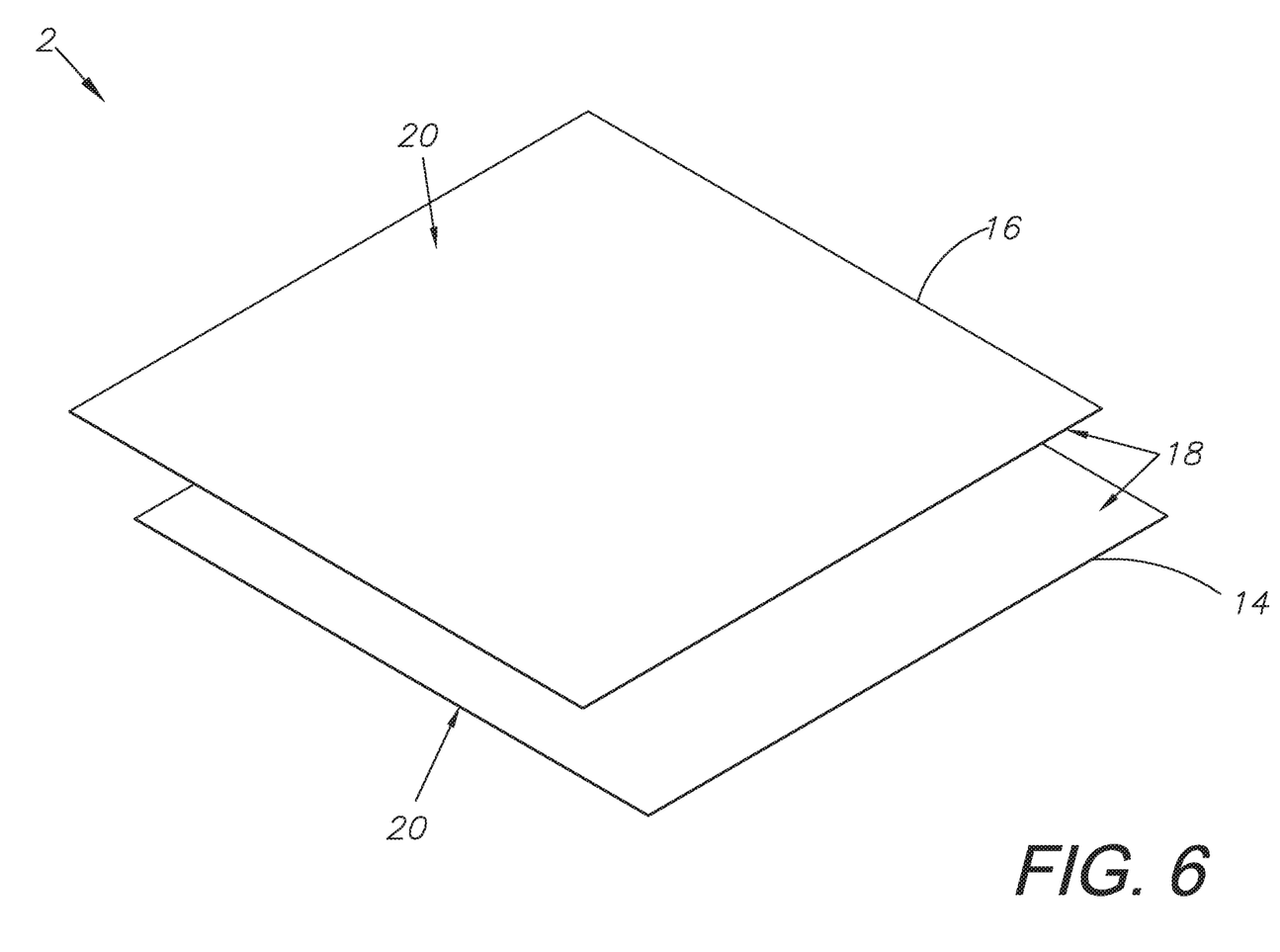
FIG. 6 is a three-dimensional isometric view of a third step of using the preferred embodiment of the present invention of aligning fabric.
Figure 7:
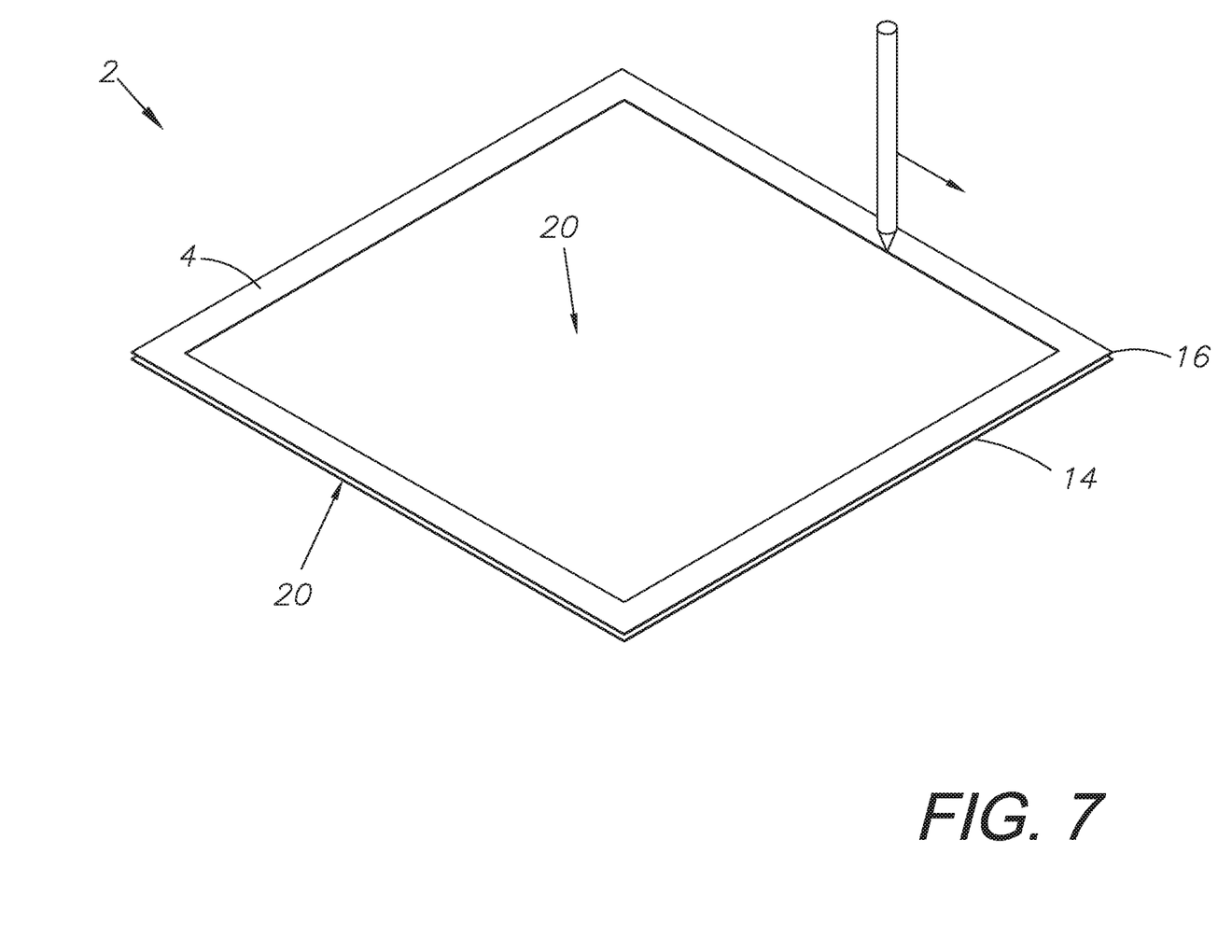
FIG. 7 is a three-dimensional isometric view of a fourth step of using the preferred embodiment of the present invention of marking fabric again.

As shown in FIG. 1, for example, the present invention includes a generally flat template frame which can be sized for pillows of specific dimensions. As shown, three frames 4, 6, 8 of 18", 20", and 22" respectively, can be nested inside one another and can be used for creating pillows of those dimensions. Each frame has an inner edge 7 and an outer edge 9, with the depth between those edges providing a suitable seam allowance when the pillow is made, as is shown in FIGS. 6 and 7. Markings 10 allow for measuring of fabric or other materials.

Figure 2:
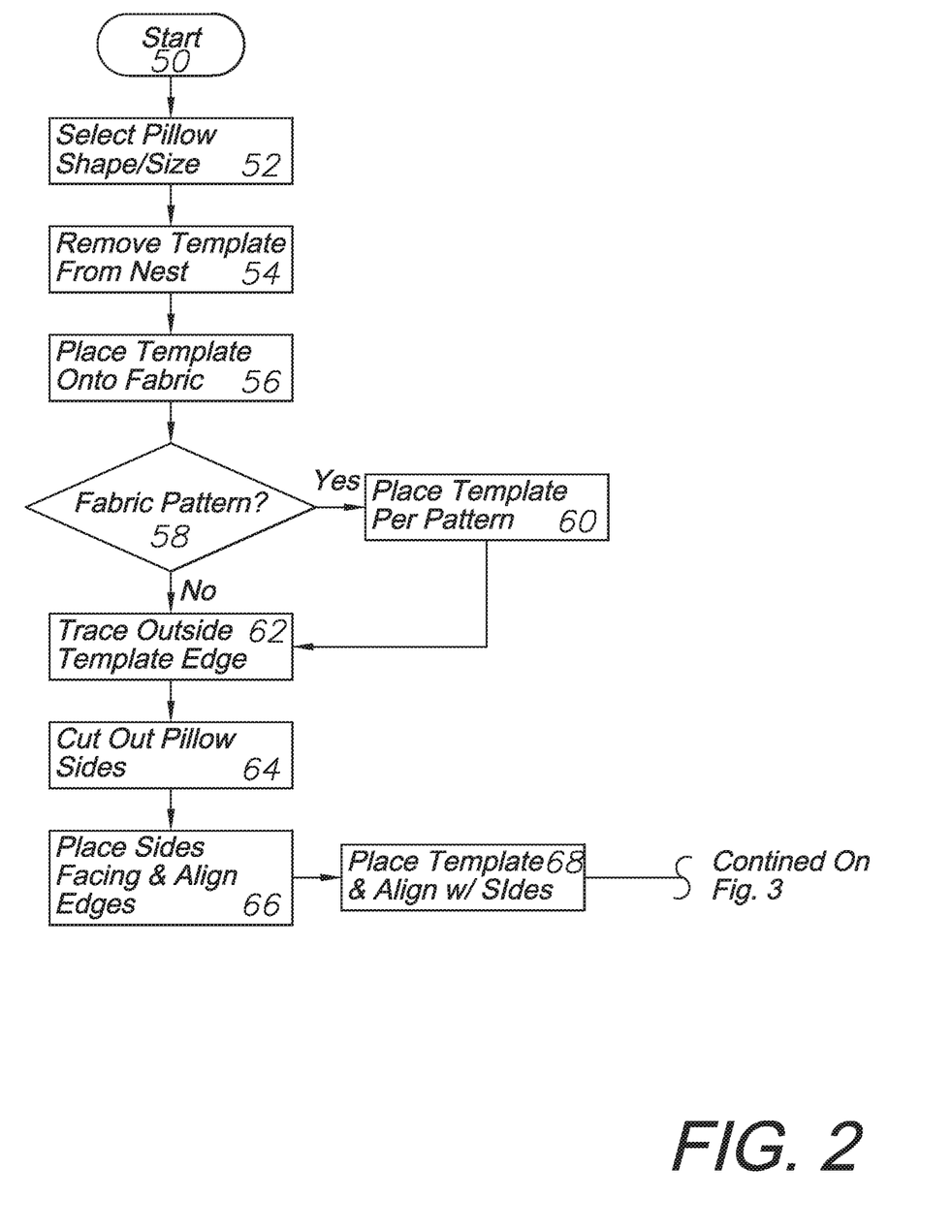
FIG. 2 is a flowchart stepping through a method of practicing an embodiment of the present invention.
Figure 3:
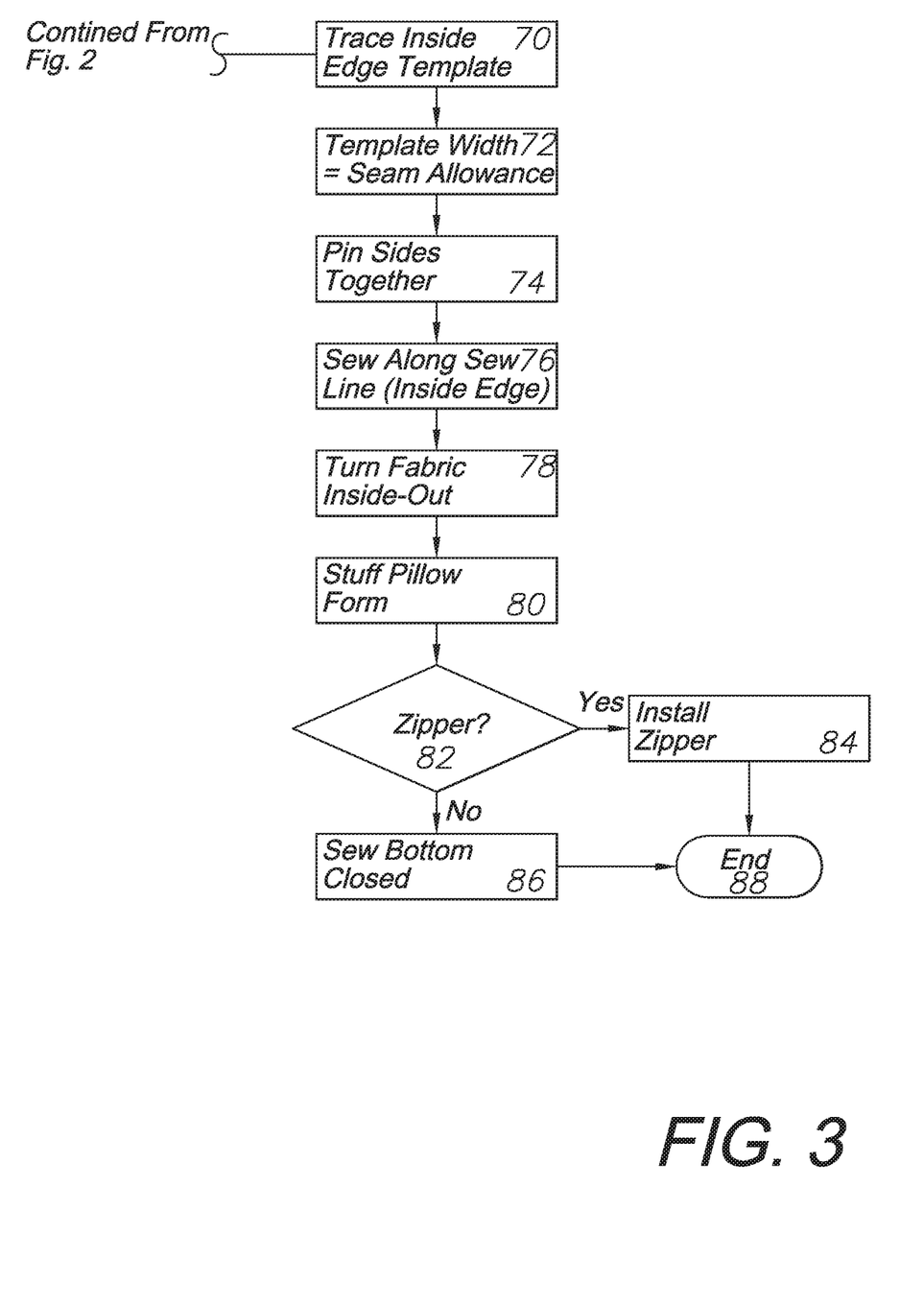
FIG. 3 is a continuation thereof.
Figure 4:
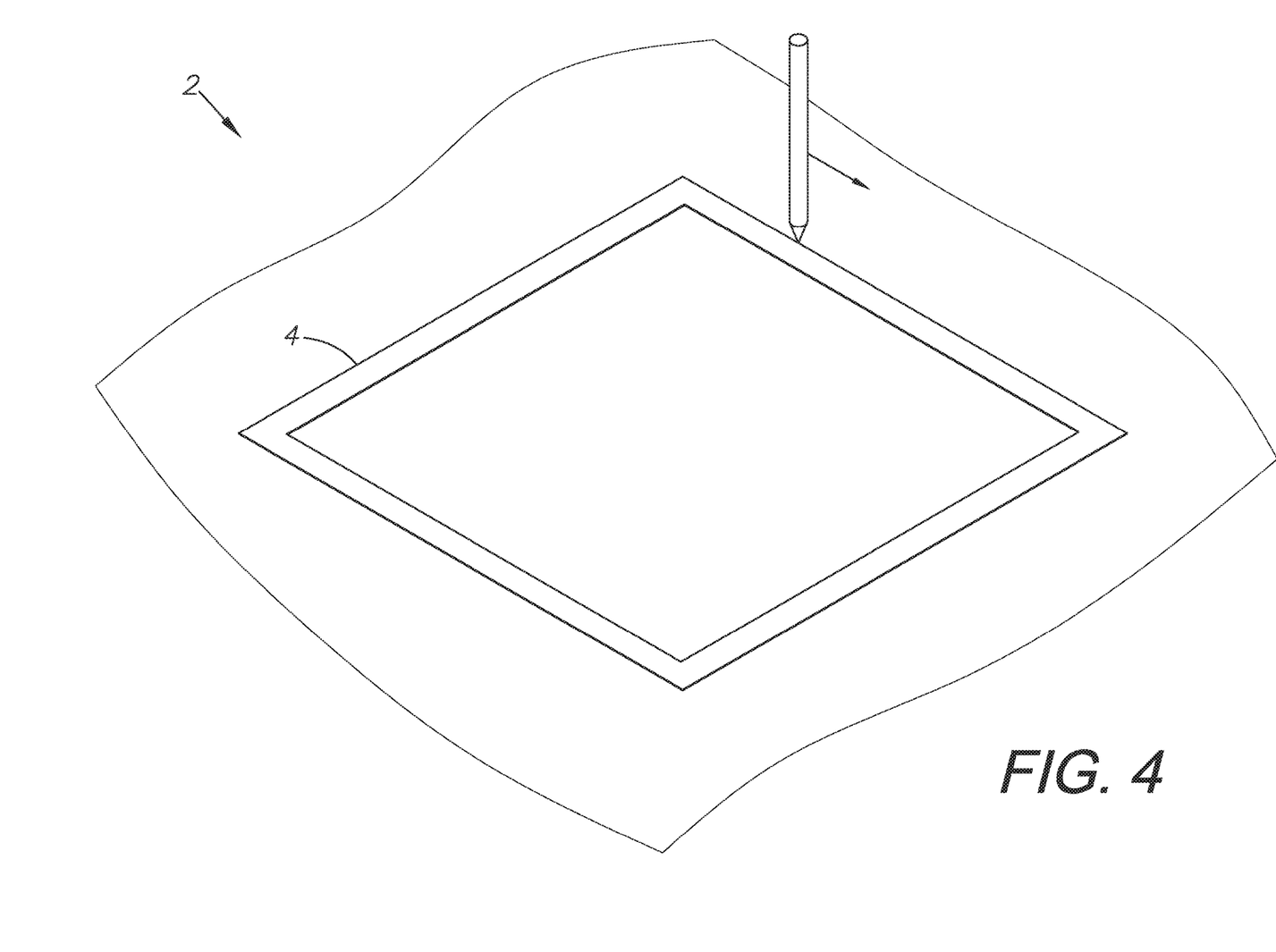
FIG. 4 is a three-dimensional isometric view of a first step of using the preferred embodiment of the present invention by marking fabric.
Figure 5:
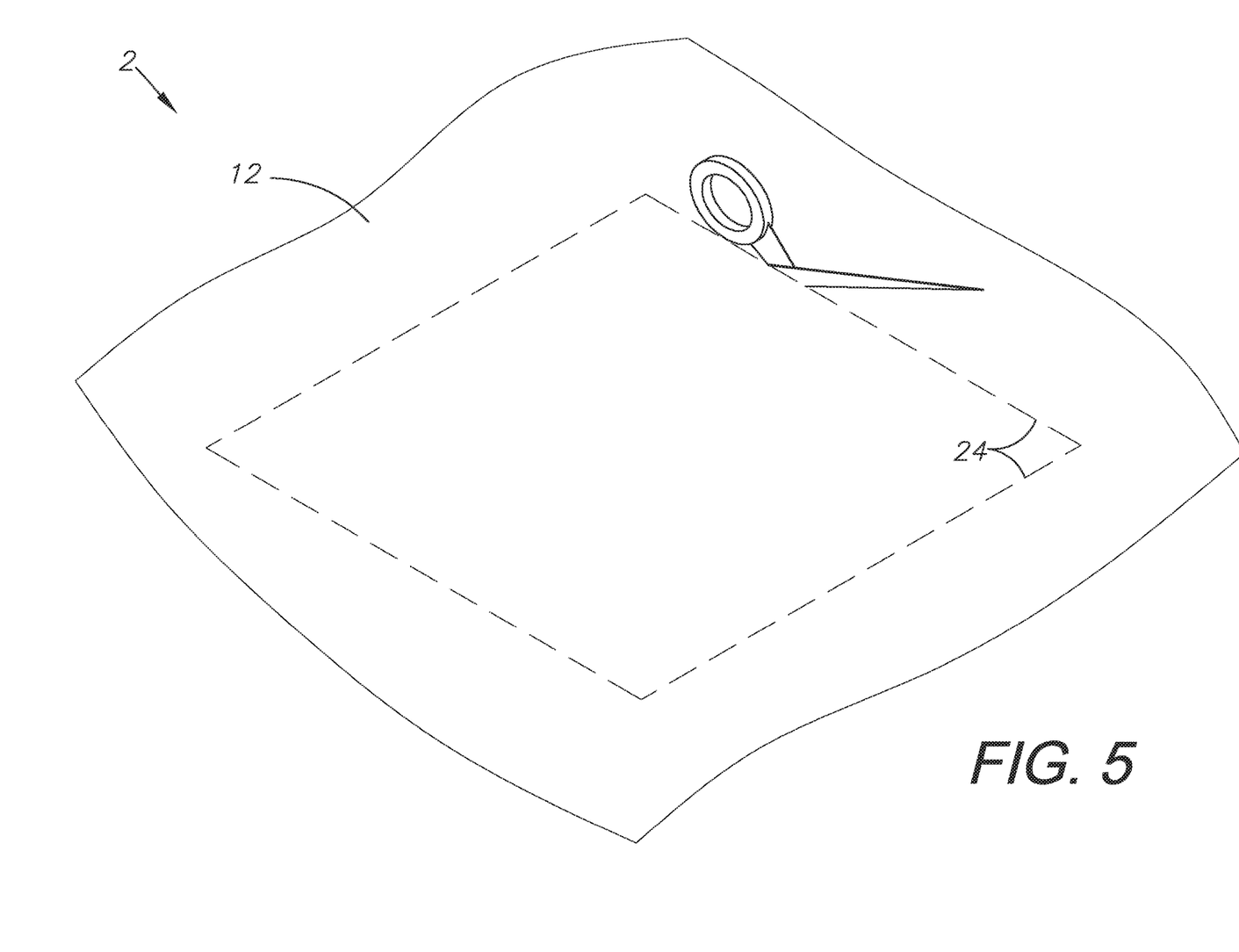
FIG. 5 is a three-dimensional isometric view of a second step of using the preferred embodiment of the present invention by cutting fabric.

FIGS. 2 and 3 show a step-by-step method of practicing an embodiment of the present invention whereby the template frame is used to create a pillow from fabric. If the fabric has patterns, the present invention lends itself even more utility as it is much easier to line the frame up with the patterns of the fabric compared with the previous method of measuring and cutting fabric for pillows. The inner edge of the frame could be painted or colored darker than the transparent nature of the rest of the frame to provide an easier visual indicator of where the pattern will end when the pillow is sewn up.

As shown in FIGS. 2 and 3, the process starts at 50. A pillow shape and size is selected by selecting a template at 52, such as one of the templates 4, 6, 8, of FIG. 1. The selected template is removed from the nest at 54. The selected template is placed onto the fabric at 56. Fabric may have a pattern or may be blank. If the fabric has a pattern at 58, the template is placed on the fabric in a way to best associate the pattern at 60. Otherwise the template is simply placed on the fabric. The outside edge of the template is traced at 62, and the pillow sides are cut out of the fabric at 64.

A second piece of fabric is cut out in the same manner as above. The two pieces of fabric are placed together with their outside faces facing each other at 66. The template is then placed on the aligned fabric at 68.

The inside edge of the template is traced at 70. The width of the template creates the seam allowance at 72.

The sides are pinned together at 74. The edge marked by the inside edge of the template is sewn at 76, leaving one open end. The two pieces of fabric are then turned inside out at 78 and the formed pillow is stuffed at 80 through the open end. If the pillow is to have a zipper installed at 82, the zipper is sewn into the open end at 84 and the process ends at 88. Otherwise the open end is simply sewn closed at 86, and the process ends at 88.

FIGS. 4-10 show visual representations of some of the steps taken in the method captured by FIGS. 2-3. The template 4 is placed on the fabric 12 in FIG. 4, and the outside edge 24 is traced and then cut along the line shown in FIG. 5. A first pillow form 14 and a second pillow form 16 are thus created. The top faces 18 of the two pillow forms are placed against one another, with the exterior faces 20 facing outward as shown in FIG. 6.

The template 4 is then placed on the stacked pieces of fabric 14, 16 and the inside edge 7 is traced along the template on the top face 20 of one of the pillow forms as shown in FIG. 7.

Figure 8:
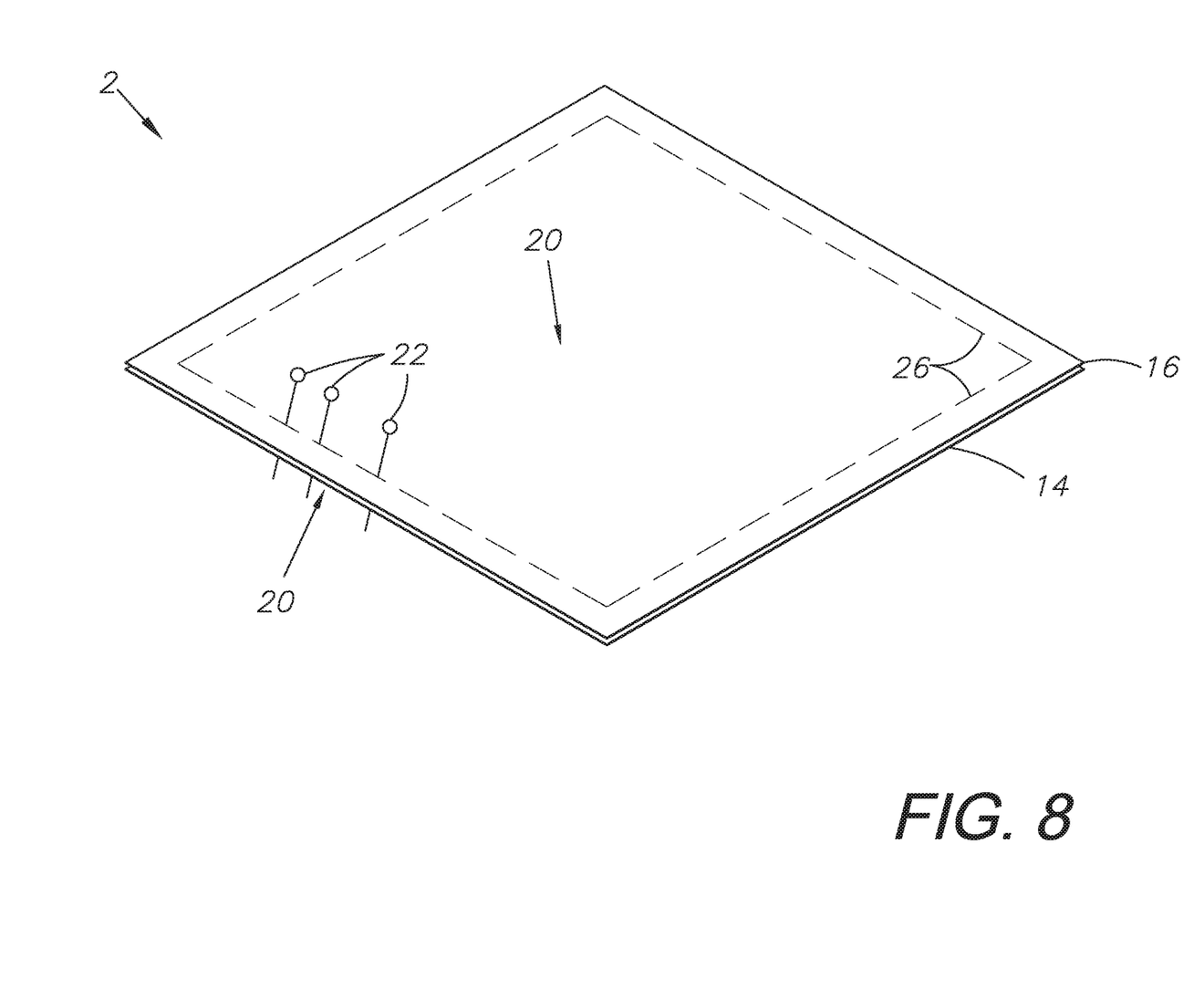
FIG. 8 is a three-dimensional isometric view of a fifth step of using the preferred embodiment of the present invention of pinning and sewing fabric together.

The two pillow forms are pinned together as shown in FIG. 8 using pins 22 and the two pillow forms are sewn together along the marked line 26. One end is left open.

Figure 9:
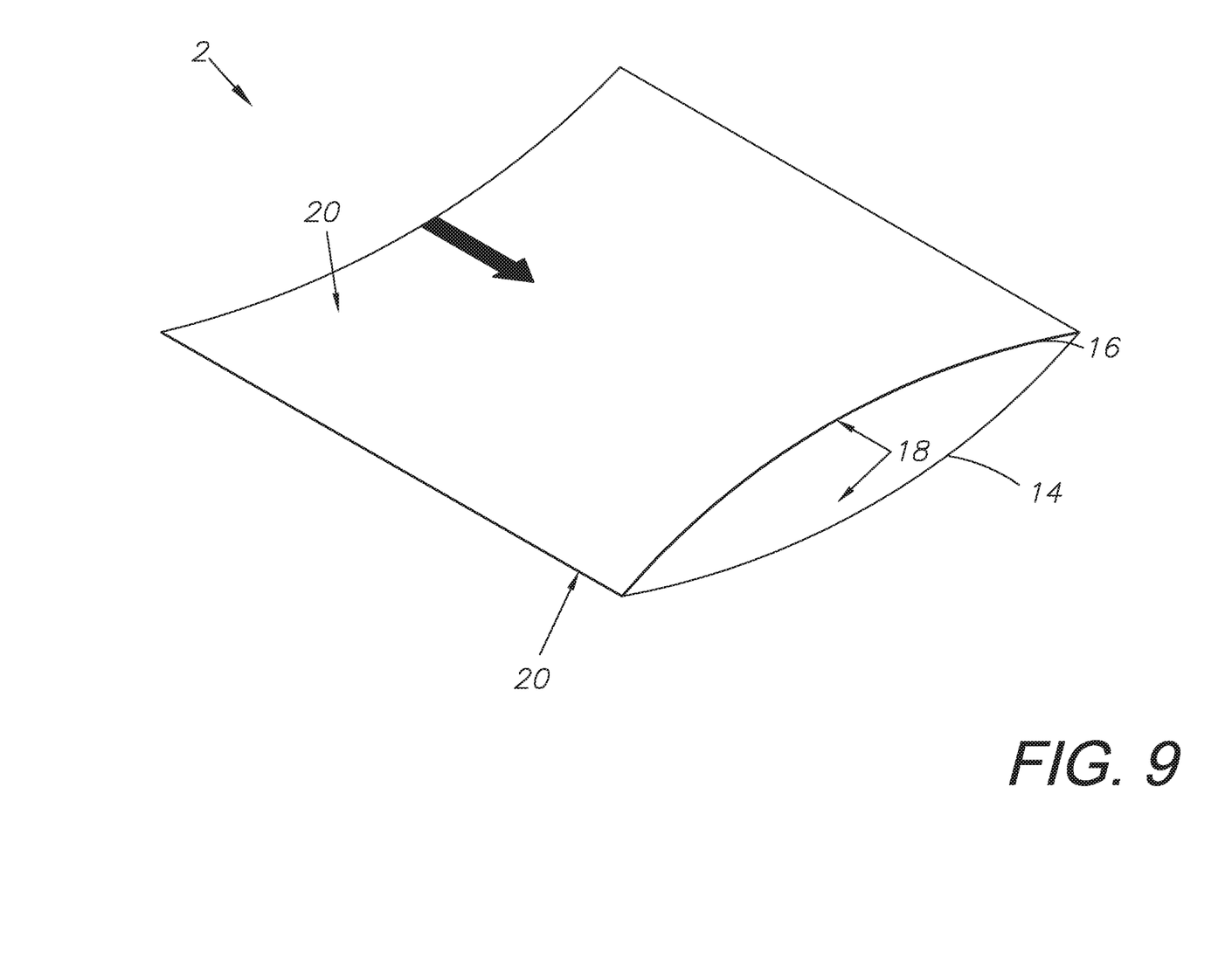
FIG. 9 is a three-dimensional isometric view of a sixth step of using the preferred embodiment of the present invention of inverting sewn pillow exterior.
Figure 10:
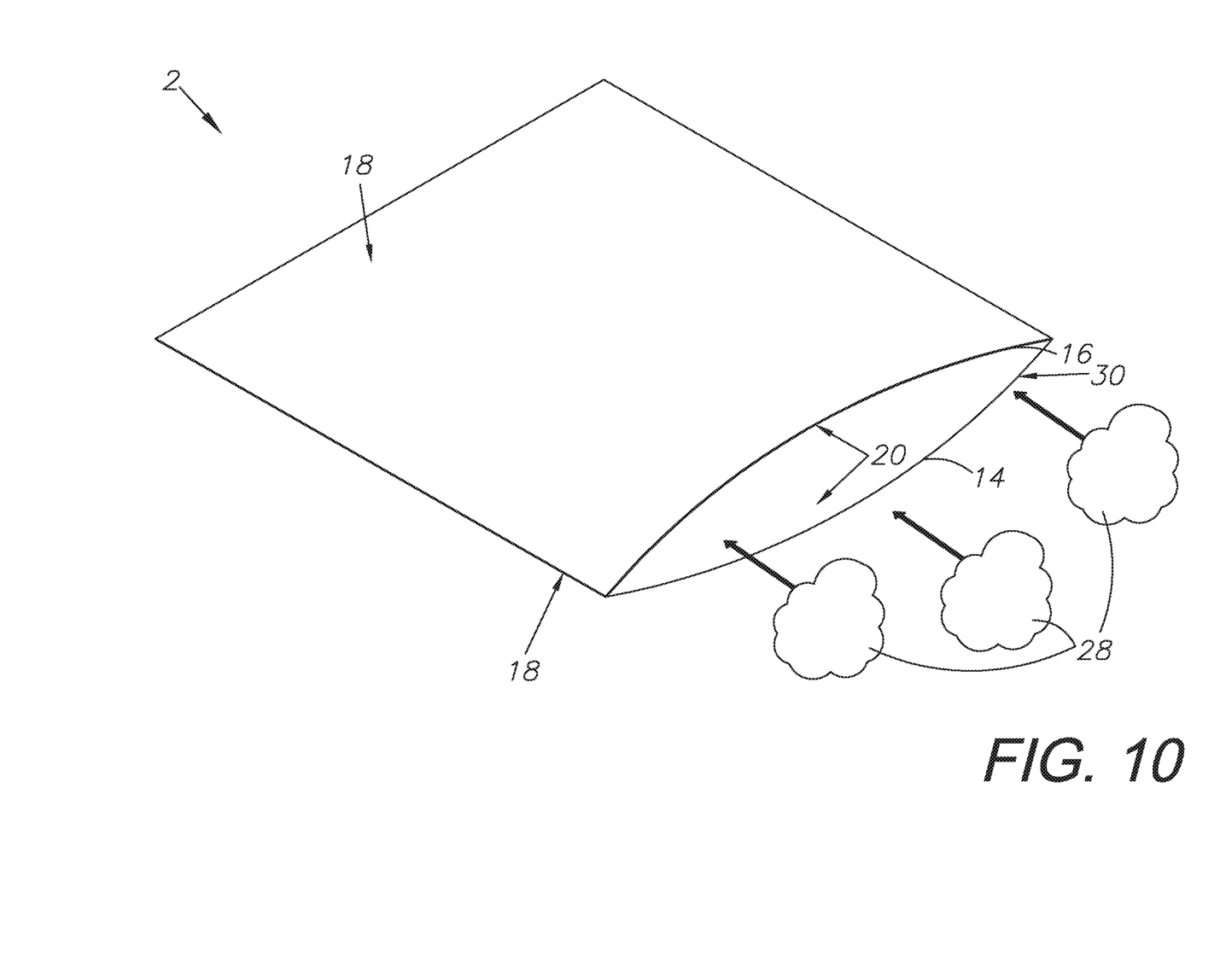
FIG. 10 is a three-dimensional isometric view of a seventh step of using the preferred embodiment of the present of stuffing the pillow.

The two pillow forms are pulled inside out as shown in FIG. 9. The pillow is stuff as shown in FIG. 10 using stuffing 28 through the open end 30. The open end is then either sewn shut or a zipper may be installed along the open end.

The frames could be made of semi-flexible material that does not retain a memory, allowing the frame to be rolled up but which can easily unroll to be used again. Alternatively, each side of the frame could be connected to the adjacent edges via pins or other pivot elements to allow the frame to be folded up for easy storage and transport of the frame.

The frame templates as shown in FIG. 1 are square, but any conceivable design could be created using a frame having an inner edge, an outer edge, and a seam allowance generated between the two edges.

Using the frames of the embodiment disclosed herein, it is very simple for any person to pick up a piece of material and quickly mark the material for transformation into a pillow.

While the figures show square templates for a square-shaped pillow, the templates could be of any shape and size for any shape and sized pillow, such as triangular, polygonal, rectangular, or circular.

It is to be understood that while certain embodiments and/or aspects of the invention have been shown and described, the invention is not limited thereto and encompasses various other embodiments and aspects.

Having thus described the invention, what is claimed as new and desired to be secured by Letters Patent is:

1. A pillow template system comprising:
    a plurality of nestable frames, including at least a first frame and as second frame, wherein said first frame is configured to be nested within said second frame;
    each of said plurality of nestable frames having an inner edge, an outer edge, and a width between said inner edge and said outer edge
    wherein said outer edge is configured for marking a cutting edge along a piece of fabric, and wherein a first pillow side and a second pillow side are formed from a cutting of said fabric along said cutting edge;
    wherein said inner edge is configured for marking a sew line on said piece of fabric;
    wherein said width is configured to provide a seam allowance on said fabric;
    a pillow structure configured to be formed by sewing said first and second pillow sides together about said sew line and inverting said first and second pillow sides; and
    said pillow structure configured to be filled with stuffing.

2. The pillow template system of claim 1, further comprising a zipper placed along one side of said pillow structure.

3. The pillow template system of claim 1, wherein said pillow is shaped as a polygon.

4. The pillow template system of claim 1, wherein said pillow is shaped as a rectangle.

5. The pillow template system of claim 1, wherein said pillow is shaped as a circle.

6. A method of creating a pillow, the method comprising the steps:
    removing a selected one frame from a nested plurality of frames;
    placing said selected one frame onto a first piece of fabric;
    marking a first cut line along an outer edge of said selected one frame onto said first piece of fabric, removing said selected one frame from said first piece of fabric, and cutting said first piece of fabric along said cut line, thereby creating a first pillow side;
    marking a second cut line along said outer edge of said selected one frame onto a second piece of fabric, removing said selected one frame from said second piece of fabric, and cutting said second piece of fabric along said second cut line, thereby creating a second pillow side;
    wherein each of said first and second pillow sides have a respective outer face and a respective inner face;
    stacking said first pillow side atop said second pillow side such that said outer face of said first pillow side against said outer face of said second pillow side;
    placing said selected one frame atop said first pillow side;
    marking a sew line along an inner edge of said selected one frame onto said first pillow side;
    pinning said first pillow side to said second pillow side;
    sewing said first pillow side to said second pillow side along said sew line while leaving an unsewn edge;
    inverting said first pillow side and said second pillow side such that said inner face of said first pillow side and said inner face of said second pillow side form an internal space;
    placing stuffing between said first pillow side and said second pillow side within said internal space through said unsewn edge; and
    closing said unsewn edge.

7. The method of claim 6, further comprising the step:
    closing said unsewn edge by sewing said unsewn edge closed.

8. The method of claim 6, further comprising the steps:
    sewing a zipper into said unsewn edge; and
    closing said unsewn edge with said zipper.

9. The method of claim 6, wherein said pillow structure is shaped as a polygon.

10. The method of claim 6, wherein said pillow structure is shaped as a rectangle.

11. The method of claim 6, wherein said pillow structure is shaped as a circle.

* * * * *